United States Patent
Bueno et al.

(10) Patent No.: US 7,586,252 B2
(45) Date of Patent: Sep. 8, 2009

(54) PHOSPHOR SCREEN AND IMAGING ASSEMBLY

(75) Inventors: Clifford Bueno, Clifton Park, NY (US); Steven Jude Duclos, Clifton Park, NY (US); David Michael Hoffman, New Berlin, WI (US); John Michael Cuffe, Reedsville, PA (US)

(73) Assignee: General Electric Company, Niskayuana, NY (US)

( * ) Notice: Subject to any disclaimer, the term of this patent is extended or adjusted under 35 U.S.C. 154(b) by 663 days.

(21) Appl. No.: 11/135,012

(22) Filed: May 23, 2005

(65) Prior Publication Data

US 2006/0261722 A1    Nov. 23, 2006

(51) Int. Cl.
    *H01J 29/06* (2006.01)
(52) U.S. Cl. ............... 313/485; 313/461; 250/370.09; 250/484.2
(58) Field of Classification Search ........................ None
    See application file for complete search history.

(56) References Cited

U.S. PATENT DOCUMENTS

| | | | |
|---|---|---|---|
| 3,389,255 A | 6/1968 | Takizawa et al. | |
| 3,564,260 A | 2/1971 | Tanaka et al. | |
| 3,872,309 A | 3/1975 | De Belder et al. | |
| 4,011,455 A | 3/1977 | Waller et al. | |
| 4,549,083 A | 10/1985 | Ozawa | |
| 4,914,303 A | 4/1990 | Knuepfer | |
| 5,213,894 A | 5/1993 | Kim | |
| 5,569,530 A * | 10/1996 | Dooms et al. | 428/323 |
| 5,663,005 A | 9/1997 | Dooms et al. | |
| 5,882,547 A | 3/1999 | Lynch et al. | |
| 6,069,439 A * | 5/2000 | Matsuda et al. | 313/461 |
| 6,093,347 A | 7/2000 | Lynch et al. | |
| 6,391,434 B1 | 5/2002 | Duclos | |
| 6,744,056 B1 | 6/2004 | Ogawa | |
| 7,147,936 B2 * | 12/2006 | Louwet et al. | 428/690 |
| 7,211,942 B1 * | 5/2007 | Ogawa | 313/467 |
| 7,291,290 B2 * | 11/2007 | Sakai et al. | 252/301.4 R |
| 7,291,672 B2 * | 11/2007 | Taneichi et al. | 524/590 |

(Continued)

FOREIGN PATENT DOCUMENTS

EP    0393662    8/1996

(Continued)

OTHER PUBLICATIONS

WO 2004/41964 A1, E. R. Holland, "Process for Preparing Inorganic Phosphors," May 21, 2004.

(Continued)

*Primary Examiner*—Ashok Patel
(74) *Attorney, Agent, or Firm*—Penny A. Clarke

(57) ABSTRACT

A phosphor admixture includes a phosphor powder and a number of radiation capture electron emitters. The emitters are dispersed within the phosphor powder. A phosphor screen includes phosphor particles, radiation capture electron emitters and a binder. The emitters and phosphor particles are dispersed within the binder. An imaging assembly includes a phosphor screen configured to receive incident radiation and to emit corresponding optical signals. An electronic device is coupled to the phosphor screen. The electronic device is configured to receive the optical signals from the phosphor screen and to generate an imaging signal.

23 Claims, 1 Drawing Sheet

U.S. PATENT DOCUMENTS

| | | | |
|---|---|---|---|
| 2003/0111955 A1 | 6/2003 | McNulty et al. | |
| 2004/0262536 A1 | 12/2004 | Van den Bergh et al. | |
| 2005/0002490 A1 | 1/2005 | Berg et al. | |
| 2005/0029462 A1 | 2/2005 | Lyons et al. | |

FOREIGN PATENT DOCUMENTS

| | | |
|---|---|---|
| EP | 0648254 | 10/1996 |
| WO | 9400531 | 1/1994 |
| WO | 0071637 | 11/2000 |

OTHER PUBLICATIONS

D. Hreniak et al., "Structural and Spectroscopic Studies of Lu2o3/Eu3+ Nanocrystallites Embedded in SiO2 Sol-Gel Ceramics,:" Journal of Physics and Chemistry of Solids, 20003, pp. 111-119.

J. Trojan-Piegza et al., "Preparation of Nanocrystalling Lu2O3:Eu Phosphor via a Molten Salts Route," Journal of Alloys and compounds, 2004, pp. 118-122.

C. Brecher et al., "Hole Traps in Lu2O3:Eu Ceramic Scintillators. I. Persistent Afterglow," Journal of Luminescence, 2004, pp. 159-168.

A. Lempicki et al., "Scintillation Materials for Medical Applications," Final Report, Boston University Department of Chemistry, Grant No. DE-FG02-90ER60133, Dec. 1, 1997-Nov. 30, 1999, pp. 1-26.

Carel W E van Eijk, "Inorganic Scintillators in Medical Imaging," Institute of Physics Publishing, Physics Med. Biol. 47 (2002) R-85-R106, Topical Review, R85-R106.

* cited by examiner

PHOSPHOR SCREEN AND IMAGING ASSEMBLY

BACKGROUND

The invention relates generally to imaging assemblies and more specifically to phosphor admixtures and phosphor screens for imaging assemblies.

Typically, for certain radiography systems, radiation (such as X-rays) is transmitted through an object and converted into light of corresponding intensity using a light production layer. Exemplary light production layers include phosphor screens. The light generated by the light production layer is provided to an electronic device. The electronic device is adapted to convert the light signals generated by the light production layer to corresponding electrical signals. The electrical signals are then used to construct an image of the object.

Radiography is performed using different radiation energies for different applications. Typically, industrial applications, such as nondestructive testing and baggage inspection applications, involve higher radiation energy levels than do medical applications. For high radiation energies (for example, above 1 MeV), phosphor screens can only capture adequate radiation when they have both a high atomic number and a sufficient thickness to absorb a large portion of the x-ray beams. However, heavy luminescent materials are typically inefficient emitters under x-rays. Accordingly, electron intensification is typically needed for high-energy (>150 kV) applications, whereas electron intensification is generally not needed for lower energy (<150 kV) applications. Moreover, the use of thicker screens reduces the spatial resolution of the resulting converted image.

Previous techniques to provide electron intensification include placing metallic plates in intimate contact with the phosphor screen. For this technique, electrons are deposited onto the phosphor, and electron intensification occurs. However, many of the electrons are trapped in the bulk of the metallic plate and thus do not intensify the phosphor screen. Additionally, the electrons may also be trapped in the support layer, typically a Mylar® layer, before reaching the active phosphor layer. Mylar ® is a registered tradename of DuPont Teijin Films.

It would therefore be desirable to provide an improved light production layer with electron intensification. It would further be desirable for the light production layer to be suitable for use with high energy radiation.

BRIEF DESCRIPTION

One aspect of the present invention resides in a phosphor admixture that includes a phosphor powder and a number of radiation capture electron emitters. The emitters are dispersed within the phosphor powder.

Another aspect of the present invention resides in a phosphor screen that includes phosphor particles, radiation capture electron emitters and a binder. The emitters and phosphor particles are dispersed within the binder.

Yet another aspect of the present invention resides in an imaging assembly that includes a phosphor screen configured to receive incident radiation and to emit corresponding optical signals. The phosphor screen includes phosphor particles, radiation capture electron emitters and a binder. The emitters and phosphor particles are dispersed within the binder. The imaging assembly further includes an electronic device coupled to the phosphor screen. The electronic device is configured to receive the optical signals from the phosphor screen and to generate an imaging signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
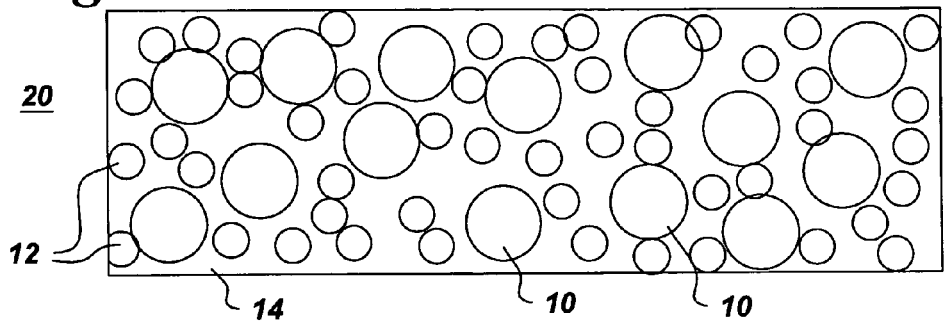
FIG. 1 illustrates an exemplary embodiment of the present invention, which includes a binder.
Figure 2:
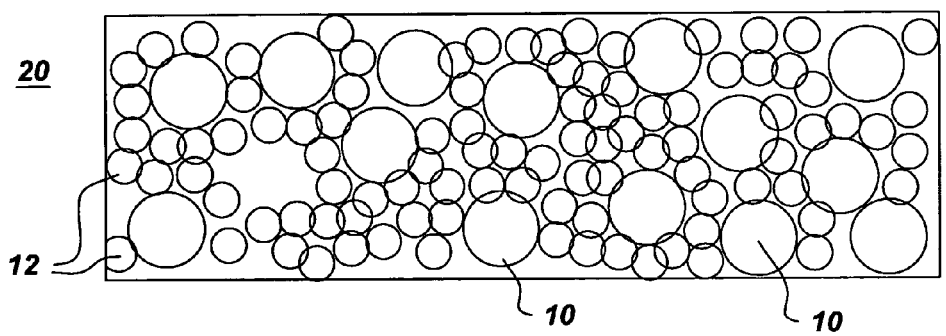
FIG. 2 illustrates another exemplary embodiment of the present invention without a binder.

A phosphor admixture embodiment of the invention is described with reference to FIGS. 1 and 2. As shown, for example, in FIGS. 1 and 2, the phosphor admixture comprises a phosphor powder 12 and a number of radiation capture electron emitters ("emitters") 10. The emitters are dispersed within the phosphor powder. Preferably the emitters are well dispersed thoughout the admixture and are not agglomerated. For the exemplary embodiment depicted in FIG. 1, for example, the phosphor admixture 20 further comprises a binder 14, and the phosphor powder 12 and emitters 10 are suspended in the binder 14. Exemplary binders include silicone binders, potassium silicates, ceramic binders that withstand high temperature and glasses. FIG. 2 illustrates a binderless example of the phosphor admixture.

The desired ratio of emitters and phosphor powder to binder will vary based on application and the specific materials used. However, for one exemplary embodiment the ratio of emitters and phosphor powder to binder is in a range of about 0.1 to about 0.75 by volume. As used herein, the term "about" should be understood to refer to ten percent (10%) of the recited values. According to a more particular embodiment, the ratio of emitters and phosphor powder to binder is in a range of about 0.3 to about 0.5 by volume.

Similarly, the desired ratio of emitters to phosphor powder will vary based on applications and on the specific phosphor powders and emitters used. However, for one exemplary embodiment, the ratio of emitters to phosphor powder is in a range of about 0.1 to about 0.9 by volume. According to a more particular embodiment, the ratio of emitters to phosphor powder is in a range of about 0.3 to about 0.5 by volume.

The emitters may be advantageously combined with a number of different phosphors, examples of which include, without limitation, $Gd_2O_2S:(Tb^{3+})$, $Gd_2O_2S:(Tb^{3+}, Pr^{3+})$, $Y_{1.34}Gd_{0.60}O_3:(Eu^{3+}, Pr^{3+})_{0.06}$ (HILIGHT®), $BaFBr:Eu^{2+}$ (a storage phosphor), $Lu_2O_3:(Eu^{3+}, Tb^{3+})$, CsI:Tl, NaI:Tl, CsI:Na, $Y_2O_3:Eu^{3+}$, $Gd_2O_3:Eu^{3+}$ and combinations thereof. This list is meant to be illustrative and not exhaustive. Many other phosphor powders are applicable, common examples of which include, without limitation, $CdWO_4$, BGO ($Bi_4Ge_3O_{12}$), LSO ($Lu_2SiO_5:Ce$), GSO ($Gd_2SiO_5:Ce$), YAP ($YAlO_3:Ce$), LuAP ($LuAlO_3:Ce$) and LPS ($Lu_2Si_2O_7:Ce$).

A variety of materials can be used to form the emitters 10. Typically, high atomic number particles are employed. As used here, the phrase "high atomic number" indicates an atomic number of at least 26. The high atomic number, high density emitters provide both x-ray absorption and electron excitation to the phosphor particles when the resulting screen assembly is irradiated with x-rays. As such, this combination of emitters with phosphor particles provides improved x-ray or gamma ray imaging properties relative to those achievable using either component alone. Beneficially, the emitters 10 offer intensification and scatter rejection. In particular, the intimate contact of the phosphor 12 with the emitters 10 enhances utilization of the emitted electrons because electron self-trapping is less pronounced than for the prior art metallic radiator plates. Consequently, improved image contrast, higher imaging speed and more uniform images can be achieved.

For certain embodiments, the emitters 10 are luminescent. Exemplary luminescent emitters include $HfO_4$, $LuO_3:Eu^{3+}$ and combinations thereof. Some examples of lower Z phosphors that would benefit from a combination with higher Z phosphors include ZnS:Ag, ZnS: ZnCdS: Cu, Al. Beneficially, use of luminescent emitters results in a duality of light and electron emission. Further, the blended phosphor would include a high conversion efficiency, low Z phosphor combined with a high x-ray absorption efficiency, lower converting high Z phosphor. The high conversion efficiency, low Z phosphor helps provide light, while the moderate to low efficiency, high Z phosphor will help in absorption and re-emission of secondary radiation that can be captured by the high conversion efficiency low Z phosphor.

For other embodiments, the emitters are non-luminescent, examples of which include, without limitation, lead oxide ($PbO$, $PbO_2$, $Pb_2O_3$ and $Pb_3O_4$), tantalum oxide ($TaO$, $TaO_2$ and $Ta_2O_5$), tungsten oxide ($WO_2$ and $WO_3$), bismuth oxide ($Bi_2O_3$) and combinations thereof. There are several benefits of this embodiment. For example, the high Z elements absorb and re-emit electrons. Further, these materials are optically transparent at the emission wavelength of the phosphor and do not absorb the phosphor emission, which would be detrimental to the efficiency of the phosphor screen.

Other exemplary emitters are selected from the group consisting of hafnium oxide ($HfO_2$), tantalum oxide ($TaO$, $TaO_2$ and $Ta_2O_5$), tungsten oxide ($WO_2$ and $WO_3$), rhenium oxide ($ReO_2$, $ReO_3$, $Re_2O_3$ and $Re_2O_7$) and combinations thereof. Benefits similar to those discussed in the previous paragraph apply to this embodiment.

For certain embodiments, the emitters are selected from the rare earth oxides group. As used herein, the term "rare earth oxides group" corresponds to oxides of the rare earth elements, which correspond to the lanthanide series that runs from atomic number 57 to 71 in the periodic table. Examples of rare earth oxides include lutitium oxide ($LuO_3$) and lanthanum oxide ($La_2O_3$). These examples would work with the low Z phosphors such as ZnS. The rare earths added can also be activated to be luminescent under ionizing or penetrating radiation, such as $Lu_2O_3:(Eu^{3+}, Tb^{3+})$, Gd2O3: (Eu3+ or Tb3+), or La2O3: (Eu3+ or Tb3+).

For other embodiments, the emitters are selected from the group consisting of strontium oxide ($SrO$ and $SrO_2$), yttrium oxide ($Y_2O_3$), zirconium oxide ($ZrO_2$), niobium oxide ($NbO$, $NbO_2$, $Nb_2O_5$), molybdenum oxide ($MoO$, $MoO_2$, $MoO_3$, $Mo_2O_3$ and $Mo_2O_5$) and combinations thereof. According to a more particular embodiment, the oxides are white and non-absorbing, but reflecting of the light produced. Many oxides fall into this category.

According to a particular embodiment, the emitters comprise at least two materials. More particularly, at least one of the materials is luminescent, and at least one other of the materials is non-luminescent. In one example, the luminescent material is $LuO3:Eu^{3+}$ and the nonluminescent material is PbO. Beneficially, $LuO3:Eu^{3+}$ offers relatively good x-ray (radiation) stopping power and good x-ray-to-light conversion efficiency, while the heavy Z number nonluminescent PbO further enhances the x-ray absorption and in turn emits electrons that can then be captured by the luminescent phosphor particles to then emit light. In this case the capture length is short, and the spatial resolution in the resulting image can remain high.

In an exemplary embodiment, the emitters are nano-particles. As used herein, "nano-particles" are characterized by a particle size in a range of about $10^{-9}$ to about $10^{-6}$. According to a particular embodiment, the particle size of the emitters is less than about 300 nm. More particularly, the emitters comprise high atomic number particles loaded as nano-oxide (or other optically transparent nano-particles), such that the emitters provide x-ray absorption and electron emission but do not block the light being emitted from the luminescent particles. Beneficially, by forming nano-particle emitters, x-ray absorption is improved while optical scattering is not significantly affected. This improves light emission exitance from the resulting phosphor screen through enhanced luminescence, and offers a non-absorbing pathway for the light to exit the phosphor screen.

A phosphor screen embodiment of the invention is described with reference to FIG. 1. As shown for example in FIG. 1, the phosphor screen 20 includes a number of phosphor particles 12, a number of radiation capture electron emitters 10, and a binder 14. The binder may be any binder compatible with the phosphor system. In some exemplary embodiments, a silicone binder is used. Silicone binders provide good refractive index matching characteristics with the phosphor particles, and allow light to emit from deep layers and hence enable the use of thick phosphor plates. The emitters 10 and phosphor particles 12 are dispersed within the binder 14. According to a particular embodiment, the binder 14, emitters 10 and phosphor particles 12 are configured as a free-standing phosphor screen 20.

Figure 3:
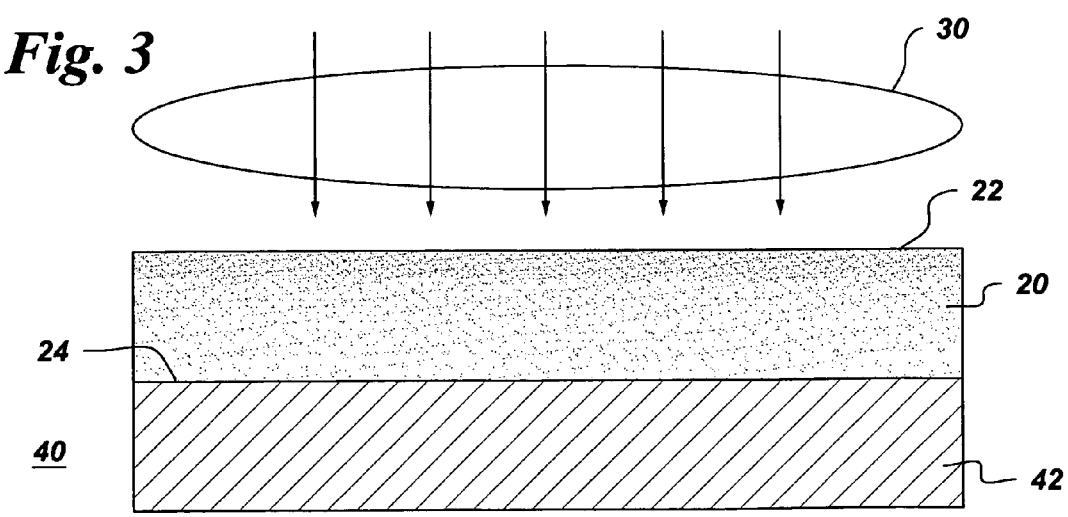
FIG. 3 depicts an imaging assembly with a phosphor screen having a varying concentration of emitters.

For the exemplary embodiment shown in FIG. 3, the phosphor screen 20 includes a source side 22 configured for facing a radiation source 30 and a device side 24. The radiation source varies based on the application, and examples include x-rays, gamma rays, thermal neutrons and high-energy elemental particle radiation sources. Note for thermal neutrons, other emitters such as beta or gamma emitters can be used that have a high capture cross section, but do not fluoresce well under this radiation. Examples of these can include hydrogeonous compounds, organic materials or metallic hydrides, gadolinium oxides and other high thermal neutron cross sections. These are merely examples and should not be interpreted to restrict the types of radiation that may be used. The concentration of emitters at the source side 22 is larger than the concentration of emitters at the device side 24. Beneficially, by concentrating the emitters at the source side 22, enhanced electron intensification and radiation scatter reduction is provided at the source side 22. According to a particular embodiment, the emitters are nano-particles. For this embodiment, a sedimentation process can be used to vary the concentration of emitters across the screen 20 because the phosphor particles are much larger (typically, in a range of about one to about ten microns). For another preparation method, thin films (not shown) of varying emitter/phosphor concentrations are screen printed or otherwise formed (for example with a doctor blade etc) and then the resulting films are laminated or otherwise pressed together to form the screen 20.

For other particular embodiments of the phosphor screen, the emitters are nano-particles and/or comprise at least two materials, as discussed above.

An imaging assembly 40 embodiment of the invention is described with reference to FIG. 3. Imaging assembly 40 may be used to perform radiography or tomography. For example, imaging assembly 40 may be used to inspect components, examples of which include, without limitation, turbine blades, castings, welded assemblies, and aircraft fuselage frames. As indicated in FIG. 3, the imaging assembly 40 includes a phosphor screen 20 configured to receive incident radiation and to emit corresponding optical signals. The phosphor screen is discussed above. As used herein, the phrase "optical signals" should be understood to mean light. The wavelength of the light emitted by the phosphor screen is determined by the type of phosphor(s) (including any luminescent emitters) used. The imaging assembly 40 further includes an electronic device 42 coupled to the phosphor screen 20. The electronic device 42 is configured to receive the optical signals from the phosphor screen 20 and to generate an imaging signal. The electronic device 42 may be coupled to the phosphor screen 20 in several ways, including optical coupling (for example using a fiber optic plate), direct coupling and lens coupling. Exemplary electronic devices include CCD, CMOS, photodiode arrays, photo-avalanche arrays, and amorphous silicon arrays. Typically, the electronic device 42 includes a number of light sensitive pixels arranged in an array. The array may be linear or an area array. In other embodiments, single pixel devices may be employed, such as photomultiplier tubes (PMTs). Beneficially, phosphor screen 20 provides high contrast optical signals to electronic device 42. In addition, phosphor screen 20 facilitates higher imaging speeds and provides scatter rejection yielding a more uniform image. Further, the emitters 10 dispersed throughout phosphor screen 20 can offer additional shielding from incident radiation to electronic device 42.

The imager assembly described herein may have a wide variety of uses. For example, it may be useful in any system where conversion of high-energy radiation to electric signals is involved. Specifically, it may be useful in a variety of industrial and medical imaging applications, including x-ray radiography, mammography, intra-oral radiography (in dentistry), fluoroscopy, x-ray computed tomography, radionuclide imaging such as positron emission tomography, industrial and non-destructive testing; passive and active screening of baggage and containers.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A phosphor screen configured to receive incident x-rays and to emit a plurality of corresponding optical signals, said phosphor screen comprising
    a plurality of phosphor particles;
    a plurality of x-ray capture electron emitters, wherein said phosphor particles and said emitters are separate particles; and
    a binder, wherein said emitters and said phosphor particles are dispersed within said binder.

2. The phosphor screen of claim 1, wherein said emitters are nano-particles.

3. The phosphor screen of claim 1, wherein a ratio of said emitters and phosphor powder to said binder is in a range of about 0.1 to about 0.75 by volume.

4. The phosphor screen of claim 3, wherein the ratio of said emitters and phosphor powder to said binder is in a range of about 0.3 to about 0.5 by volume.

5. The phosphor screen of claim 1, wherein a ratio of said emitters to said phosphor powder is in a range of about 0.1 to about 0.9 by volume.

6. The phosphor screen of claim 5, wherein the ratio of said emitters to said phosphor powder is in a range of about 0.3 to about 0.5 by volume.

7. The phosphor screen of claim 1, wherein said phosphor powder is selected from the group consisting of $Gd_2O_2S:(Tb^{3+})$, $Gd_2O_2S:(Tb^{3+}, Pr^{3+})$, $Y_{1.34}Gd_{0.60}O_3:(Eu^{3+},Pr^{3+})_{0.06}$, $BaFBr:Eu^{2+}$, $Lu_2O_3:(Eu^{3+}, Tb^{3+})$, CsI:Tl, NaI:Tl, CsI:Na, $Y_2O_3:Eu^{3+}$, $Gd_2O_3:Eu^{3+}$ and combinations thereof.

8. The phosphor screen of claim 1, wherein said emitters are luminescent.

9. The phosphor screen of claim 8, wherein said emitters are selected from the group consisting of $HfO_4$, $LuO3:Eu^{3+}$ and combinations thereof.

10. The phosphor screen of claim 1, wherein said emitters are non-luminescent.

11. The phosphor screen of claim 10, wherein said emitters are selected from the group consisting of lead oxide (PbO, $PbO_2$, $Pb_2O_3$ and $Pb_3O_4$), tantalum oxide (TaO, $TaO_2$ and $Ta_2O_5$), tungsten oxide ($WO_2$ and $WO_3$), bismuth oxide ($Bi_2O_3$) and combinations thereof.

12. The phosphor screen of claim 1, wherein said emitters are selected from the group consisting of hafnium oxide ($HfO_2$), tantalum oxide (TaO, $TaO_2$ and $Ta_2O_5$), tungsten oxide ($WO_2$ and $WO_3$), rhenium oxide ($ReO_2$, $ReO_3$, $Re_2O_3$ and $Re_2O_7$) and combinations thereof.

13. The phosphor screen of claim 1, wherein said emitters are selected from the rare earth oxides group.

14. The phosphor screen of claim 1, wherein said emitters are selected from the group consisting of strontium oxide (SrO and $SrO_2$), yttrium oxide ($Y_2O_3$), zirconium oxide ($ZrO_2$), niobium oxide (NbO, $NbO_2$, $Nb_2O_5$), molybdenum oxide (MoO, $MoO_2$, $MoO_3$, $Mo_2O_3$ and $Mo_2O_5$) and combinations thereof.

15. The phosphor screen of claim 1, wherein said emitters comprise at least two materials.

16. The phosphor screen of claim 15, wherein at least one of said materials is luminescent, and wherein at least one other of said materials is non-luminescent.

17. The phosphor screen of claim 1, wherein said binder, emitters and phosphor particles are configured as a free-standing phosphor screen.

18. The phosphor screen of claim 1, further comprising a source side configured for facing a radiation source and a device side, wherein a concentration of said emitters at the source side is larger than a concentration of said emitters at the device side.

19. An imaging assembly comprising:
    a phosphor screen configured to receive incident x-rays and to emit a plurality of corresponding optical signals, said phosphor screen comprising a plurality of phosphor particles, a plurality of x-ray capture electron emitters and a binder, wherein said phosphor particles and said emitters are separate particles, and wherein said emitters and said phosphor particles are dispersed within said binder; and
    an electronic device coupled to said phosphor screen, wherein said electronic device is configured to receive the optical signals from said phosphor screen and to generate an imaging signal.

20. The imaging assembly of claim 19, wherein said binder, emitters and phosphor particles are configured as a free-standing phosphor screen.

21. The imaging assembly of claim 19, wherein said phosphor screen further comprises a source side configured for facing a radiation source and a device side, wherein a concentration of said emitters at the source side is larger than a concentration of said emitters in the device side.

22. The imaging assembly of claim 19, wherein said emitters are nano-particles.

23. The imaging assembly of claim 19, wherein said emitters comprise at least two materials.

* * * * *

UNITED STATES PATENT AND TRADEMARK OFFICE
CERTIFICATE OF CORRECTION

PATENT NO.      : 7,586,252 B2                                    Page 1 of 1
APPLICATION NO. : 11/135012
DATED           : September 8, 2009
INVENTOR(S)     : Bueno et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 995 days.

Signed and Sealed this

Fourteenth Day of September, 2010

David J. Kappos
*Director of the United States Patent and Trademark Office*